(No Model.)

H. C. ARMSTRONG, D. E. BIGELOW, & G. L. OSBORN.
KITCHEN CABINET.

No. 448,494. Patented Mar. 17, 1891.

WITNESSES:
Paul Johst
C. Sedgwick

INVENTOR:
H. C. Armstrong
D. E. Bigelow
BY G. L. Osborn
Munn & Co
ATTORNEYS

THE NORRIS PETERS CO., PHOTO-LITHO., WASHINGTON, D. C.

UNITED STATES PATENT OFFICE.

HENRY C. ARMSTRONG, DAVID E. BIGELOW, AND GEORGE L. OSBORN, OF ASHLAND, WISCONSIN.

KITCHEN-CABINET.

SPECIFICATION forming part of Letters Patent No. 448,494, dated March 17, 1891.

Application filed March 29, 1890. Serial No. 345,878. (No model.)

*To all whom it may concern:*

Be it known that we, HENRY C. ARMSTRONG, DAVID E. BIGELOW, and GEORGE L. OSBORN, all of Ashland, in the county of Ashland and State of Wisconsin, have invented a new and useful Improved Kitchen-Cabinet, of which the following is a full, clear, and exact description.

Our invention relates to an improved device for retaining flour, sifting it, and conveniently holding the implements, also spices and other ingredients used in the production of bread and pastry, the object being to provide a compact, shapely, convenient, and inexpensive device of the character indicated which will afford a dust-proof receptacle for flour, a means to sift it as used, and separate compartments for the ready stowage of different spices, flavorings, sugars, and like materials, as well as the retention close to hand of a bake-board and other implements needed in the manufacture of bread, cakes, and pies, and, further, to provide an adjustably-supported table which is hinged to the side of the cabinet and which may hang pendent when not in use as an adjunct of the same.

To this end our invention consists in the construction and combination of parts, as is hereinafter described, and indicated in the claims.

Reference is to be had to the accompanying drawings, forming a portion of this specification, in which similar letters of reference indicate corresponding parts in all of the figures.

Figure 3:
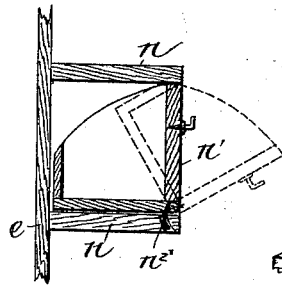
Figure 4:
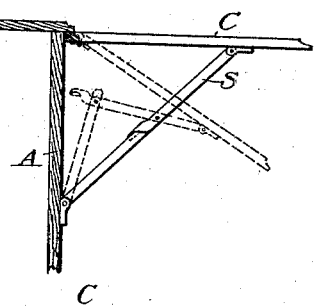
Figure 2:
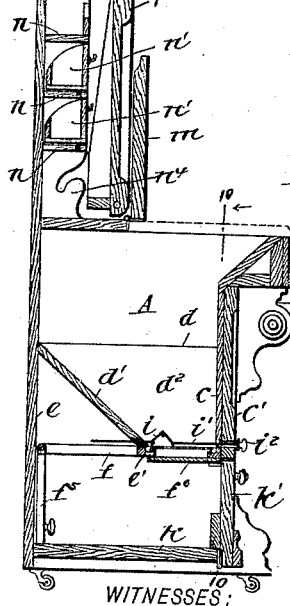
Figure 5:
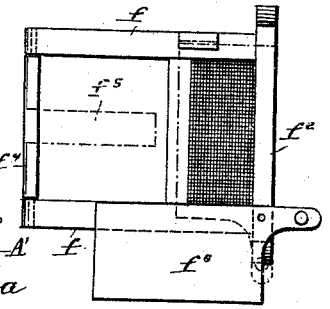
Figure 6:
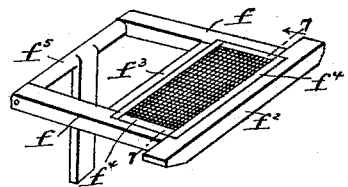
Figure 7:
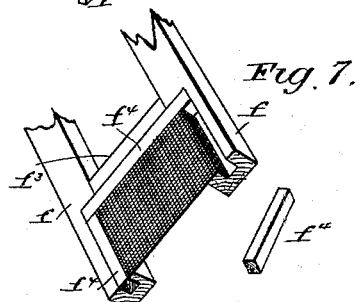
Figure 10:
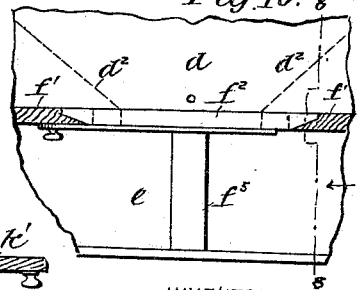
Figures 8, 9:
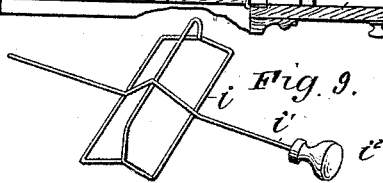

Figure is a front elevation of the cabinet opened in its upper portion with a bake-board in position for use. Fig. 2 is a side elevation with the side wall removed to expose interior parts, which are in closed adjustment, as would appear in front, except the lid of the lower section of the cabinet, which is elevated. Fig. 3 is an enlarged side view in section of one of a series of tilting receptacles that are arranged in rows in the upper portion of the cabinet. Fig. 4 is a side view of an adjustable table-leaf, showing the means of support provided therefor, in connection with the side of the cabinet, an adjacent side of which being also shown attached to the table-leaf. Fig. 5 is a plan view of the screen-frame and cut-off gate therefor removed from the flour-bin, of which it is a bottom portion. Fig. 6 is a perspective view of the screen-frame removed, showing locking-tongues thereon that coact with a hinged prop-support to hold the screen in engagement with the lower end of the flour-bin in the cabinet. Fig. 7 is a broken, partly perspective, partly sectional, view of the screen-frame, the section being cut on the line 7 7 of Fig. 6, and illustrates the manner of securing the screen-cloth on the frame, the locking-wedge being shown removed. Fig. 8 is an enlarged side elevation in section of the lower portion of the cabinet, representing the screen-frame in proper position therein by solid lines and as partly removed in dotted lines, the section being taken on the line 8 8 in Fig. 10. Fig. 9 is an enlarged detached view of a flour-agitator which is adapted to reciprocate upon the upper surface of the screen to work flour through it; and Fig. 10 is a front elevation in section of the lower portion of the cabinet broken, taken on the line 10 10 in Fig. 2, showing the means for supporting a movable screen-frame in position at the lower end of a contained flour-bin.

The lower portion A of the cabinet is in rectangular form, having paneled sides and an overhanging entablature A', beneath which is secured the ornamental brackets $a$ upon the stiles or vertical jambs $b$, that form the side borders for the paneled front $c'$.

Within the lower section of the cabinet a bin or flour-receptacle $d$ is formed by affixing a transverse partition $d'$ within, which is inclined forwardly and downwardly from the rear wall $e$, said partition being joined on its inwardly-converging side edges by similarly-cut lateral boards $d^2$, (shown in dotted lines in Fig. 10,) all being employed to produce converging walls for the bin, which walls are joined to a vertical front wall $c$ interior of the panel $c'$. The bar $e'$ is so placed with regard to the front wall $c$ of the flour-bin that a sufficient space will be allowed for the introduction of a removable screen-frame $f$, which will be further described. There are two aligning strips or ledges $f'$, secured across the front wall $c$ of the bin $d$, which have their top edges in the same horizontal plane with the lower edge surface of the walls of the bin. These strips are so proportionately spaced apart that their inner ends, which are suitably sloped toward each other and also inclined rearwardly, will engage the front portion of the screen-frame $f$ and hold it up against the bin-walls tightly when said frame is in place.

The screen-frame $f$ consists of two parallel strips of wood that are rectangular in cross-section and are joined at their front ends by the cross-bar $f^2$, which latter-named piece projects beyond the parallel strips and has said end portions beveled from the under sides outwardly and upwardly, a second cross-bar $f^3$ being secured at a proper distance from the front bar $f^2$ between the parallel frame-strips and of a length which will produce a rectangular frame $f$. An open recess is produced on the top face of the rectangular screen-frame $f$, wherein a properly-shaped piece of screen wire-cloth of suitable mesh is held secured removably by the wedge-strips $f^4$, that when driven into place stretch the material taut and hold it firmly.

The side parallel strips of the frame $f$ extend rearward of the cross-bar $f^3$ to fit neatly against the rear wall $e$ of the cabinet, and between the rear terminals a transverse swinging leg $f'$, that is T-form, has its transverse head-bar pivoted.

As shown in Fig. 8, the screen-frame $f$ when inserted and its leg $f^5$ adjusted in place against the rear wall $e$ will be forced closely up against the bottom edge of the hopper-shaped flour-bin $d$ and be there retained, the dotted lines in said figure illustrating the manner of folding the leg $f^5$ when the screen-frame is inserted or removed.

In Fig. 5 a swinging cut-off gate or movable bottom $f^6$ is shown that may be closed below on the screen-frame $f$, and thus prevent flour from escaping therefrom, except at a proper time, when the gate may be partly revolved on its pivot, and thus be removed to afford a clear passage into the chamber below the screen, and upon the screen a triangular wire frame $i$ is placed, which is provided with a pusher-rod $i'$, that extends through aligning perforations in the front walls of the cabinet and flour-bin and rear wall of the latter, so that it may be reciprocated by the knob $i^2$ on the pusher-rod's outer end.

Figure 1:
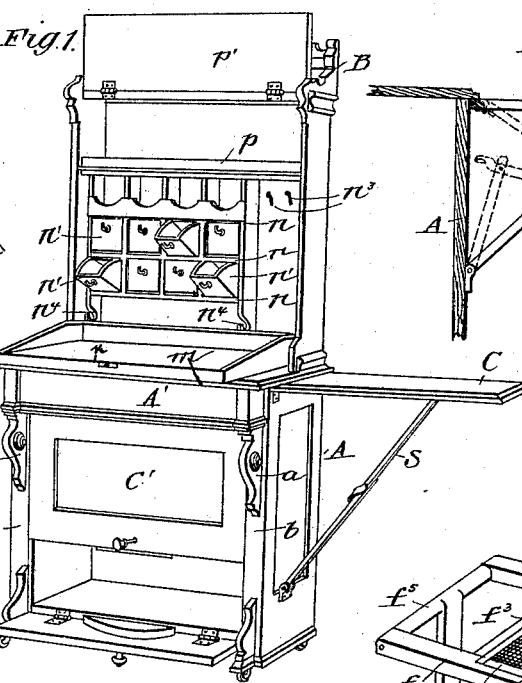

From the sieve the sifted flour will fall into any suitable vessel, such as a bake-pan, that can be placed on the bottom $k$ of the cabinet lower chamber or section when the front door $k'$ is lowered to a level position, as shown in Figs. 1 and 8. Casters are provided that are secured on the lower side of the section A at the corners. The lid $m$ affords means for the introduction of flour, and when closed seals the bin $d$, if properly jointed, thus preventing ingress of insects or dust.

Above the section A a shelved compartment B is located thereon at the rear of the lid $m$ of the lower section A, that is permitted to be elevated and rest against the front of the upper section of the cabinet, which latter is constructed having a back and two sides, there being any preferred style of ornamental conformations given to the top of these walls to add finish to the structure.

The interior of the upper section B is furnished with three or more spaced shelves $n$ $p$, the first named being provided with vertical division-walls to afford receptacles for sugar, spices, dried fruits, &c., and between the divisions of the two lower shelves $n$ there are outwardly and downwardly rocking boxes $n'$ located which have curved pins $n^2$ depending from their lower sides near their front edges, said pins engaging similarly-curved apertures in the shelves $n$, whereby the boxes are held from displacement and permitted to rock forwardly, as shown by dotted lines in Fig. 3.

When the boxes $n'$ are in normal position, their fronts lie in the same vertical plane and present a neat appearance. At one side of the shelves and boxes just described a space is afforded for hanging culinary implements used in making bread or pies, such as egg-beaters and cake-turners, suitable pins $n^3$ being provided therefor. Below the shelves $n$ a space is allowed for reception of a rolling-pin upon bracket-arms $n^4$, affixed therein. On the shelf $p$ above the other shelves $n$ canned fruits, raisins, and dried fruits may be stored, ready for use, in suitable receptacles, a hinged door $p'$ closing the upper part of the section B, while the larger door $r$, that folds upwardly, may be made to close the shelved portion of the same, both being suitably finished to present a neat appearance. Locks may be placed on the doors $p'$ and $r$ to afford security and prevent unwarranted access to the goods within.

The door $r$ serves for a bake-board when in normal or lowered position, it having side ledges and a back strip on it to prevent flour working over these edges.

The table-leaf C is hinged by one end to the side of the cabinet, so as to align with the top of the lower section A of the same, and when elevated to a horizontal position it is so maintained by the inclined prop-bar $s$, which latter is made of two pieces that are pivoted at one end of each to the table-leaf on its lower side and to the side of the cabinet, the adjacent ends of said pieces of the prop being lapped and pivoted so that they may flex upwardly when the leaf is to be lowered, but are prevented from downward flexure by an overlapping finger on one piece of the bar engaging the top edge of the other piece of the same, as shown in Fig. 4.

When not in service, the table-leaf will hang pendent aside of the cabinet side wall and take up no available room.

Having thus described our invention, we claim as new and desire to secure by Letters Patent—

1. The combination, with a compartment provided in its bottom near its open front end with a curved aperture, of an outward-swinging box having a curved pin $n^3$ on its side near its front end entering said recess, the upper edge of the rear end of the box being constructed to strike the top of the compartment at the forward end thereof, substantially as and for the purpose set forth.

2. The combination, with the cabinet having a chamber provided with a flour-bin having an outlet in its lower end, of the two strips or ledges $f'$ and the screen-frame having a cross-bar $f^2$ at its front end engaging the ledges $f'$, and the swinging leg at the rear end of the frame resting on the floor of said chamber and holding the screen in position, substantially as set forth.

3. In a cabinet of the character described, the screen-frame consisting in parallel side bars $ff$, front cross-bar $f^2$, projecting at its ends beyond the side bars, the bar $f^3$, a rectangular open recess being formed in said bars, a screen having its edges entering said recess, the wedge-strips $f^4$, securing the screen in place, and the swinging leg $f^5$ at the rear end of the frame, substantially as set forth.

4. The combination, with the cabinet having a compartment provided with a flour-bin $d$, having ledges $f'\,f'$, of the removable screen-frame having a removable screen, a front cross-piece $f^2$, the ends of which rest on the said ledges, and a swinging leg $f^5$ at the rear end of the screen-frame to hold it in position, a horizontally-swinging cut-off pivoted to the under side of said removable frame, and a reciprocating wire frame in the lower part of the bin over the screen, substantially as set forth.

HENRY C. ARMSTRONG.
DAVID E. BIGELOW.
G. L. OSBORN.

Witnesses:
CHAS. FISHER,
R. B. CONOLLY.